(12) United States Patent
Wang

(10) Patent No.: US 11,637,712 B2
(45) Date of Patent: Apr. 25, 2023

(54) SIGNAL INTEGRATION CIRCUIT AND ELECTRONIC DEVICE

(71) Applicant: GETAC TECHNOLOGY CORPORATION, New Taipei (TW)

(72) Inventor: Min-Yu Wang, Taipei (TW)

(73) Assignee: GETAC TECHNOLOGY CORPORATION, New Taipei (TW)

(*) Notice: Subject to any disclaimer, the term of this patent is extended or adjusted under 35 U.S.C. 154(b) by 0 days.

(21) Appl. No.: 17/588,154

(22) Filed: Jan. 28, 2022

(65) Prior Publication Data

US 2022/0360483 A1 Nov. 10, 2022

Related U.S. Application Data

(60) Provisional application No. 63/184,100, filed on May 4, 2021.

(51) Int. Cl.
| | |
|---|---|
| *H04L 9/40* | (2022.01) |
| *H04B 7/06* | (2006.01) |
| *H03F 3/189* | (2006.01) |
| *H04B 1/12* | (2006.01) |
| *H04B 1/40* | (2015.01) |

(52) U.S. Cl.
CPC ............... *H04L 9/40* (2022.05); *H03F 3/189* (2013.01); *H04B 1/12* (2013.01); *H04B 1/40* (2013.01); *H04B 7/0613* (2013.01); *H03F 2200/294* (2013.01); *H03F 2200/451* (2013.01)

(58) Field of Classification Search
CPC ..... H04L 9/40; H03F 3/189; H03F 2200/294; H03F 2200/451; H04B 1/12; H04B 1/40; H04B 7/0613; H04B 7/0808; H04B 7/082; Y02D 30/70
See application file for complete search history.

(56) References Cited

U.S. PATENT DOCUMENTS

2021/0313962 A1* 10/2021 Sugaya ................. H03H 9/542
2022/0209805 A1*  6/2022 Yu ....................... H04B 1/0007

* cited by examiner

*Primary Examiner* — Hashim S Bhatti

(57) ABSTRACT

An electronic device provided includes a communication module, an external module, and a signal integration circuit including first to fourth input ports, and first and second output ports. The first input port is for inputting an input signal. The second input port is for inputting a first L1 band signal. The third input port is for inputting a first L5 band signal. The fourth input port is for inputting a second L1 band signal and a second L5 band signal. The first output port selectively outputs a first output signal and a second output signal. The second output port selectively outputs the first L5 band signal and the second L5 band signal. When the fourth input port is not coupled to an external module, the first output port outputs the first output signal, and the second output port outputs the first L5 band signal.

16 Claims, 5 Drawing Sheets

SIGNAL INTEGRATION CIRCUIT AND ELECTRONIC DEVICE

The application claims priority to U.S. Provisional Application No. 63/184,100, filed on May 4, 2021, the disclosure of which is hereby incorporated by reference herein in its entirety.

BACKGROUND OF THE INVENTION

Field of the Invention

The present invention relates to a signal integration circuit and an electronic device, and more particularly, to a signal integration circuit and an electronic device capable of integrating multiple received input signals into to two output signals.

Description of the Prior Art

With the development of wireless broadband networks and mobile communication technologies, electronic products equipped with numerous different communication functions and external antenna modules are extensively applied, such that the number of antenna elements is also ever-increasing along with the evolving communication technologies, and this however severely affects the communication quality of electronic products. In addition, different antenna types can change circuit diagrams, layouts and routings, hence increasing costs and design time.

SUMMARY OF THE INVENTION

In view of the above, a signal integration suitable for a communication module and an external module is provided according to an embodiment of the present invention. The signal integration circuit includes a first input port, a second input port, a third input port, a fourth input port, a first output port and a second output port. The first input port is coupled to an input signal, which includes a high band signal and a non-high band signal. The non-high band signal includes a low band signal, or includes a low band signal and a first L1 band signal, wherein the first L1 band signal has an overlapping band overlapping with a specific frequency in the low band signal. The second input port is coupled to the first L1 band signal and is for inputting the first L1 band signal. The third input port is coupled to the first L5 band signal and is for inputting the first L5 band signal. The fourth input port is coupled to the external module so as to input a second L1 band signal and a second L5 band signal, wherein the external module outputs the second L1 band signal and the second L5 band signal. The band of the second L1 band signal partially overlaps with the band of the first L1 band signal, and the band of the second L5 band signal partially overlaps with the band of the first L5 band signal. The first output port is coupled to the communication module, and selectively outputs a first output signal and a second output signal. The first output signal includes a high band signal, a low band signal excluding the overlapping band signal and the first L1 band signal. The second output signal includes the high band signal, the low band signal excluding the overlapping band signal and the second L1 band signal. The second output port is coupled to the communication module, and selectively outputs the first L5 band signal and the second L5 band signal. When the fourth input port is not coupled to the external module, the first output port outputs the first output signal, and the second output port outputs the first L5 band signal.

An electronic device provided according to an embodiment of the present invention includes a communication module, an external module and a signal integration circuit. The signal integration circuit includes a first input port, a second input port, a third input port, a fourth input port, a first output port and a second output port. The first input port is coupled to an input signal, which includes a high band signal and a non-high band signal. The non-high band signal includes a low band signal, or includes a low band signal and a first L1 band signal, wherein the first L1 band signal has an overlapping band overlapping with a specific frequency in the low band signal. The second input port is coupled to the first L1 band signal and is for inputting the first L1 band signal. The third input port is coupled to the first L5 band signal and is for inputting the first L5 band signal. The fourth input port is coupled to the external module so as to input a second L1 band signal and a second L5 band signal, wherein the external module outputs the second L1 band signal and the second L5 band signal. The band of the second L1 band signal partially overlaps with the band of the first L1 band signal, and the band of the second L5 band signal partially overlaps with the band of the first L5 band signal. The first output port is coupled to the communication module, and selectively outputs a first output signal and a second output signal. The first output signal includes a high band signal, a low band signal excluding the overlapping band signal and the first L1 band signal. The second output signal includes the high band signal, the low band signal excluding the overlapping band signal and the second L1 band signal. The second output port is coupled to the communication module, and selectively outputs the first L5 band signal and the second L5 band signal. When the fourth input port is not coupled to the external module, the first output port outputs the first output signal, and the second output port outputs the first L5 band signal.

In the signal integration circuit and the electronic device provided according to the embodiments of the present invention, multiple different input signals (including the input signal, the first L1 band signal, the second L1 band signal, the first L5 band signal and the second L5 band signal) are simultaneously received by the signal integration circuit, the signals of the band overlapping with the L1 band are filtered out from the input signal, and the signals are integrated into one output signal, which is then outputted together with the L5 band signal to the input port of the communication module. Accordingly, the requirement of reducing the number of input ports of a communication module is reduced without affecting a download speed of input signals, and diversity of reception antennas and reception sensitivity for L1 and L5 bands are enhanced.

The description below is only a summary of the technical solutions of the present invention. To understand the technical means of the present invention more clearly so as to enable implementation based on the disclosure of the description of the application, and to better understand the above and other objects, features and advantages of the present invention, embodiments are described in detail with the accompanying drawings below.

DETAILED DESCRIPTION OF THE EMBODIMENTS

Figure 1:
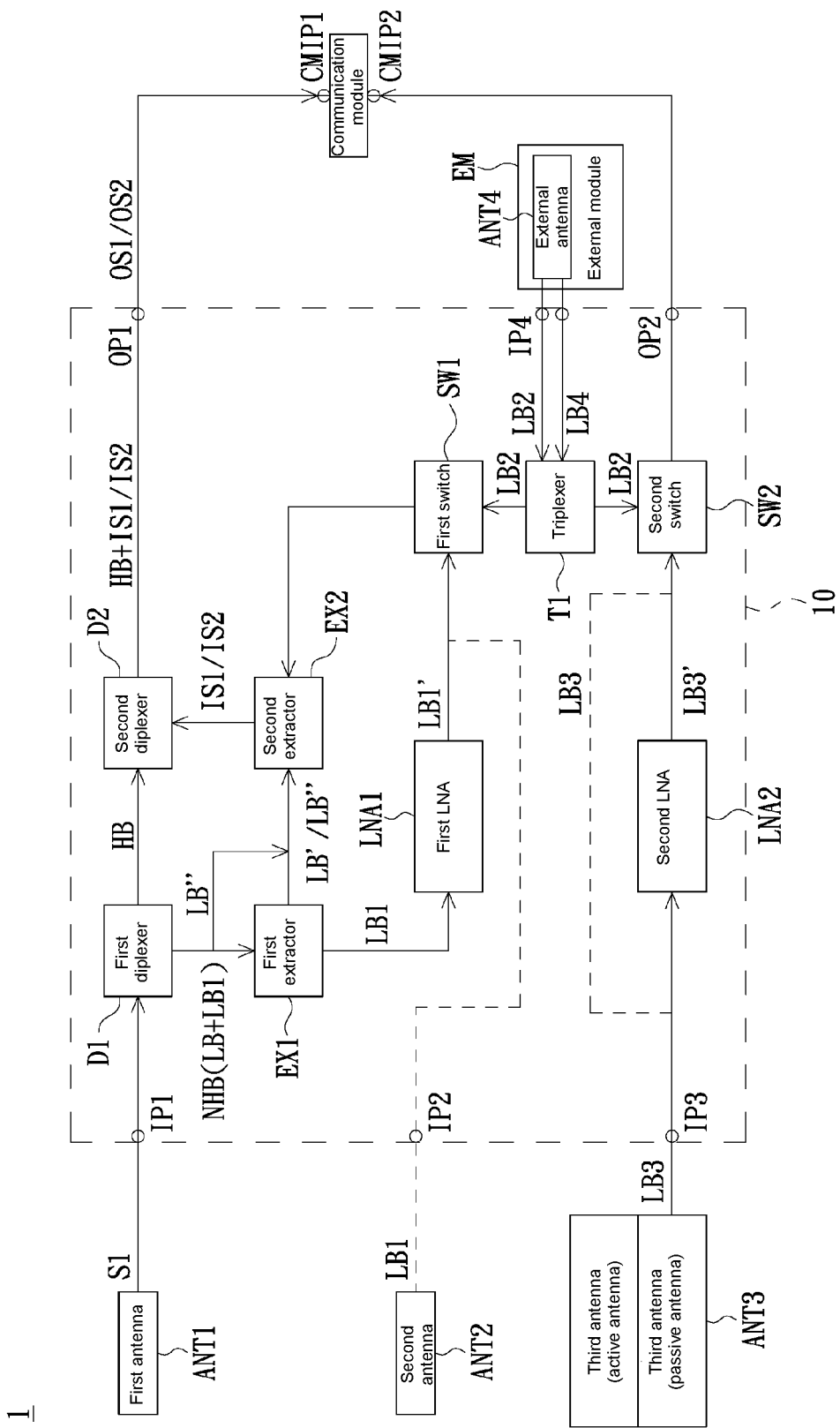
FIG. 1 is a block schematic diagram of an electronic device according to an embodiment of the present invention.

Referring to FIG. 1, FIG. 1 shows a block schematic diagram of an electronic device according to an embodiment of the present invention. An electronic device 1 includes a communication module CM, an external module EM and a signal integration circuit 10. The signal integration circuit 10 includes a first input port IP1, a second input port IP2, a third input port IP3, a fourth input port IP4, a first output port OP1 and a second output port OP2. The first input port IP1 is for inputting (receiving) an input signal S1, which includes a high band (e.g., 3.3 GHz to 5.925 GHz) signal HB and a non-high band signal NHB. The non-high band signal NHB includes a low band (e.g., 617 MHz to 2.69 GHz) signal LB and a first L1 band (e.g., 1.563 GHz to 1.61 GHz) signal LB1, wherein the first L1 band signal LB1 includes an overlapping band overlapping with a specific frequency in the low band signal LB, or includes a low band signal LB" excluding any overlapping band signal. The second input port IP2 is for inputting a first L1 band signal LB1. The third input port IP3 is for inputting a first L5 (e.g., 1.164 GHz to 1.189 GHz) band signal LB3. The fourth input port IP4 is for inputting a second L1 (e.g., 1.563 GHz to 1.61 GHz) band signal LB2 and a second L5 band (e.g., 1.164 GHz to 1.189 GHz) signal LB4, wherein the band of the second L1 band signal LB2 preferably partially overlaps with the band of the first L1 band signal LB1, and the band of the second L5 band signal LB4 preferably partially overlaps with the band of the first L5 band signal LB3.

The first output port OP1 is for outputting a first output signal OS1 or a second output signal O2 to a first input port CMIP1 of the communication module CM. The first output signal OS1 includes the high band signal HB, a low band signal LB' from which the overlapping band signal is filtered out, and an amplified first L1 band signal LB1', or includes the high band signal HB, the low band signal LB" excluding the overlapping band signal, and the first L1 band signal LB1. The second output signal OS2 includes the high band signal HB, the low band signal LB' from which the overlapping band signal is filtered out, and the second L1 band signal LB2, or includes the high band signal HB, the low band signal LB" excluding the overlapping band signal, and the second L1 band signal LB2. Thus, the first L1 band signal LB1, the amplified first L1 band signal LB1' or the second L1 band signal LB2 is prevented from interference of the low band signal LB, hence from affecting reception sensitivity of GPS with respect to the L1 band. The second output port OP2 is for outputting the first L5 band signal LB3, an amplified first L5 band signal LB3' or the second L5 band signal LB4 to a second input port CMIP2 of the communication module CM. When the fourth input port IP4 is not coupled to the external module EM, the fourth input port IP4 does not receive the second L1 band signal LB2 or the second L5 band signal LB4; at this point, the first output port OP1 outputs the first output signal OS1, and the second output port OP2 outputs the first L5 band signal LB3 or the amplified first L5 band signal LB3'. When the fourth input port IP4 is coupled to the external module EM, the fourth input port IP4 receives the second L1 band signal LB2 and the second L5 band signal LB4; at this point, the first output port OP1 outputs the second output signal OS2 and the second output port OP2 outputs the first L5 band signal LB3 or the amplified first L5 band signal LB3', or the first output port OP1 outputs the first output signal OS1 and the second output port OP2 outputs the second L5 band signal LB4. Thus, the communication module CM needs only two input ports in order to simultaneously process the first output signal OS1 or the second output signal OS2 from the first output port OP1, and the first L5 band signal LB3, the amplified first L5 band signal LB3' or the second L5 band signal LB4 from the second output port OP2, so that the number of input ports needed for the communication module CM is reduced without affecting the download speed of the input signal S1.

The external module EM is coupled to the fourth input port IP4, and the external module EM includes an external antenna ANT4. The external antenna ANT4 is preferably a GPS antenna that receives the second L1 band signal LB2 and the second L5 band signal LB4, and may be, for example, an active high gain antenna that receives 1.563 GHz to 1.61 GHz (the second L1 band signal LB2) and 1.164 GHz to 1.189 GHz (the second L5 band signal LB4).

The communication module CM includes a first input port CMIP1, a second input port CMIP2, a radio-frequency (RF) signal processing unit and a baseband signal processing unit. The first input port CMIP1 of the communication module CM is coupled to the first output port OP1 and the second input port CMIP2 is coupled to the second output port OP2. The first input port CMIP1 coupled to the first output port OP1 is for receiving the first output signal OS1 or the second output signal OS2, and the second input port CMIP2 coupled to the second output port OP2 is for receiving the first L5 band signal LB3, the amplified first L5 band signal LB3' or the second L5 band signal LB4. The function of the communication module CM is accomplished by a module that receives or transmits wireless wide area network (WWAN) signals (4G or 5G) and GPS signals, for example, by the RF signal processing unit and the baseband signal processing unit.

Moreover, the electronic device 1 further includes a first antenna ANT1, a second antenna ANT2 and a third antenna group ANT3. The first antenna ANT1 is coupled to the first input port IP1, and is preferably a 5G antenna, for example, a passive antenna receiving 617 MHz to 5.925 GHz, which receives the high band signal HB and the non-high band signal NHB. The second antenna ANT2 is coupled to the second input port IP2, and is preferably a GPS antenna, for example, an active antenna (e.g., a patch antenna having a built-in low-noise amplifier (LNA)) receiving 1.563 GHz to 1.61 GHz, which receives the first L1 band signal LB1. The third antenna group ANT3 is coupled to the third input port IP3, and is preferably an active antenna and a passive antenna, for example, an active antenna receiving 1.164 GHz to 1.189 GHz and a passive antenna receiving 1.164 GHz to 1.189 GHz, which receive the first L5 band signal LB3. The reception sensitivity of the external antenna ANT4 included in the external module EM is preferably better than the reception sensitivities of the first antenna ANT1, the second antenna ANT2 and the third antenna group ANT3, so that the signal strength of the second L1 band signal LB2 is greater than the signal strengths of the first L1 band signal LB1 and the amplified first L1 band signal LB1', and that the signal strength of the second L5 band signal LB4 is greater than the signal strengths of the first L5 band signal LB3 and the amplified first L5 band signal LB3'.

In one embodiment of the present invention, the signal integration circuit 10 further includes a first diplexer D1, a first extractor EX1, a first LNA LNA1, a triplexer T1, a first switch SW1, a second extractor EX2, a second diplexer D2, a second switch SW2 and a second LNA LNA2. The first diplexer D1 includes an input terminal, a first output terminal and a second output terminal, wherein the input terminal is coupled to the first input IP1. The function of the first diplexer D1 is to separate the input signal S1 into the high band signal HB and the non-high band signal NHB, that is, separately outputting the high band signal HB and the non-high band signal NHB, such that the non-high band signal NHB is outputted from the first output terminal and the high band signal HB is outputted from the second output terminal.

The first extractor EX1 includes an input terminal, a first output terminal and a second output terminal, wherein the input terminal is coupled to the first output terminal of the first diplexer D1. The function of the first extractor EX1 is to separating the non-high band signal NHB into the low band signal LB and the first L1 band signal LB1 (that is, separately outputting the low band signal LB and the first L1 band signal LB1), and at the same time filtering out a signal existing in the overlapping band (i.e., 1.563 GHz to 1.61 GHz) from the low band signal LB, so that the energy of such signal is minimized or even approaches zero, and to output the first L1 band signal LB1 from the first output terminal and output the low band signal LB' from which the overlapping band signal is filtered out from the second output terminal.

The first LNA LNA1 includes an input terminal and an output terminal, wherein the input terminal is coupled to the first output terminal of the first extractor EX1, and the output terminal is coupled to an input terminal of the first switch SW1. The function of the first LNA LNA1 is to amplify and output the first L1 band signal LB1 from the output terminal, so as to transmit the amplified first L1 band signal LB1' to the first switch SW1.

The triplexer T1 includes an input terminal, a first output terminal and a second output terminal, wherein the input terminal is coupled to the fourth input port IP4. The function of the triplexer T1 is to selectively output the second L1 band signal LB2 from the first output terminal and the second L5 band signal LB4 from the second output terminal.

The first switch SW1 includes a first input terminal, a second input terminal and an output terminal, wherein the first input terminal is coupled to the output terminal of the first LNA LNA1 and the second input port IP2, the second input terminal is coupled to the first output terminal of the triplexer T1, and the output terminal is coupled to a second input terminal of the second extractor EX2. The function of the first switch SW1 is to selectively couple the output terminal to the first input terminal or the second input terminal to selectively output the amplified first L1 band signal LB1', the first L1 band signal LB1 or the second L1 band signal LB2. For example, when the fourth input port IP4 is coupled to the external module EM, the first switch SW1 couples the output terminal to the second input terminal, so as to output the second L1 band signal LB2 having a greater signal strength to the second extractor EX2, thereby enhancing the GPS reception sensitivity. In contrast, when the fourth input port IP4 is not coupled to the external module EM, the first switch SW1 couples the output terminal to the first input terminal, so as to output the amplified first L1 band signal LB1' or the first L1 band signal LB1 to the second extractor EX2.

The second extractor EX2 includes a first input terminal, a second input terminal and an output terminal, wherein the first input terminal is coupled to the first output terminal of the first diplexer D1 and the second output terminal of the first extractor EX1, the second input terminal is coupled to the output terminal of the first switch SW1, and the output terminal is coupled to the second input terminal of the second diplexer D2. The function of the second extractor EX2 is to combine the low band signal LB' from which the overlapping band signal is filtered out and the amplified first L1 band signal LB1', or the low band signal LB" excluding the overlapping band signal and the first L1 band signal LB1 into a first integrated signal IS1 and output the first integrated signal IS1 from the output terminal, or to combine the low band signal LB' from which the overlapping band signal is filtered out or the low band signal LB" excluding the overlapping band signal and the second L1 band signal LB2 into a second integrated signal IS2 and output the second integrated signal IS2 from the output terminal.

The second diplexer D2 includes a first input terminal, a second input terminal and an output terminal, wherein the first input terminal is coupled to the second output terminal of the first diplexer D1, the second input terminal is coupled to the output terminal of the second extractor EX2, and the output terminal is coupled to the first output port OP1. The function of the second diplexer D2 is to combine the high band signal HB and the first integrated signal IS1 into the first output signal OS1 and output the first output signal OS1 from the output terminal, or to combine the high band signal HB and the second integrated signal IS2 into the second output signal OS2 and output the second output signal OS2 from the output terminal.

The second switch SW2 includes a first input terminal, a second input terminal and an output terminal, wherein the first input terminal is coupled to the third input port IP3 and an output terminal of the second LNA LNA2, the second input terminal is coupled to the second output terminal of the triplexer T1, and the output terminal is coupled to the second output port OP2. The function of the second switch SW2 is to selectively output the first L5 band signal LB3, the amplified first L5 band signal LB3' or the second L5 band signal LB4. For example, when the fourth input port IP4 is coupled to the external module EM, the second switch SW2 couples the output terminal to the second input terminal, so as to output the second L5 band signal LB4 having a greater signal strength to the output terminal, thereby enhancing the GPS reception sensitivity. In contrast, when the fourth input port IP4 is not coupled to the external module EM, the second switch SW2 couples the output terminal to the first input terminal, so as to output the first L5 band signal LB3 or the amplified first L5 band signal LB3' to the output terminal.

The second LNA LNA2 includes an input terminal and an output terminal, wherein the input terminal is coupled to the third input port IP3, and the output terminal is coupled to an input terminal of the second switch SW2. The function of the second LNA LNA2 is to amplify the first L5 band signal LB3 received by the passive antenna of the third antenna group ANT3 into the amplified first L5 band signal LB3' and output the amplified first L5 band signal LB3' from the output terminal.

Figure 2:
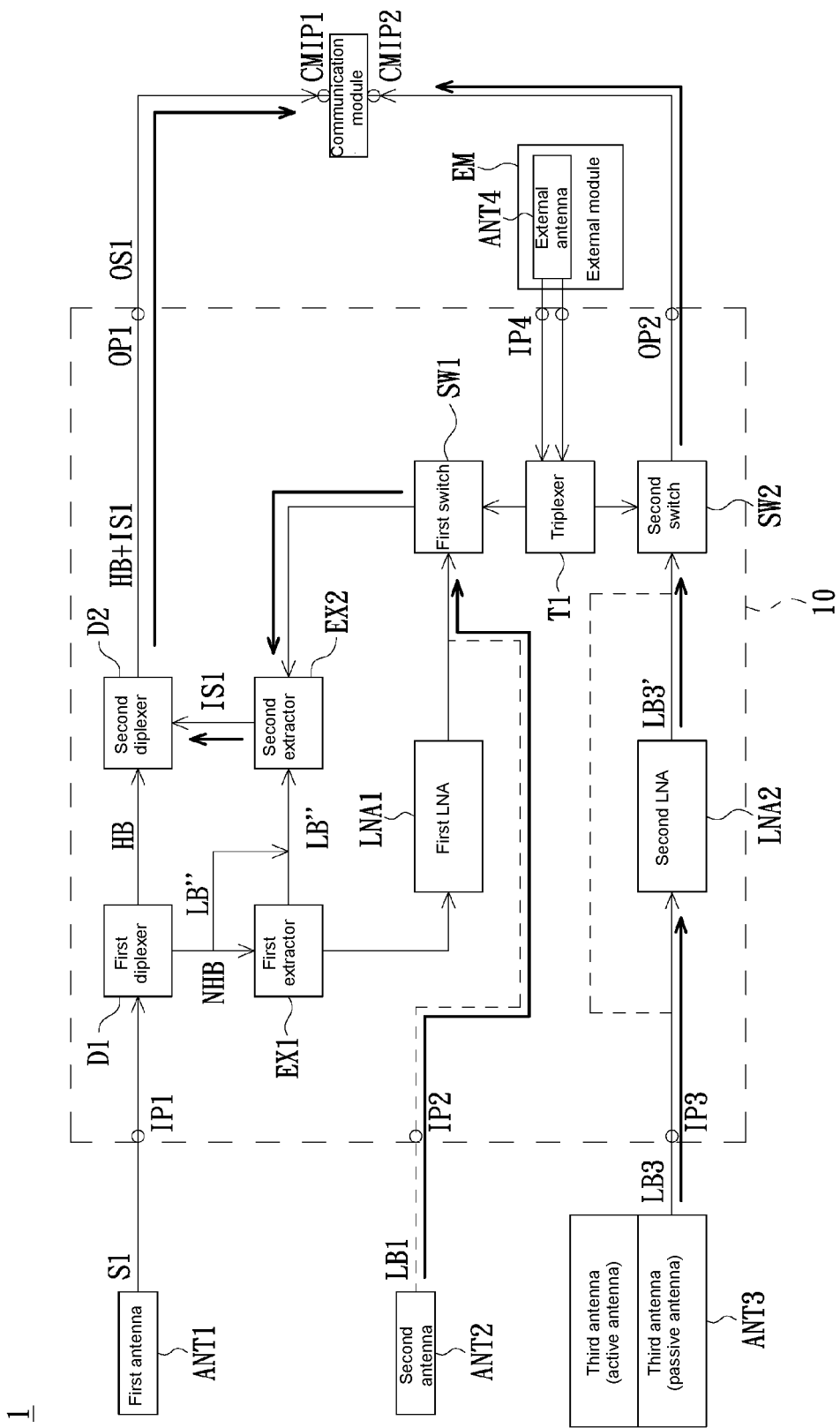
FIG. 2 is a schematic diagram of signal paths according to a first embodiment of the present invention.

Refer to FIG. 2 to FIG. 5 showing schematic diagrams of signal paths according to four embodiments of the present invention. In the first embodiment, as shown in FIG. 2, the first L1 band signal LB1 is inputted via the second antenna ANT2, and can be directly transmitted into the first switch SW1 without an LNA since the second antenna ANT2 is an active antenna. After the first L1 band signal LB1 passes through the first switch SW1, the first L1 band signal LB1 is integrated with the low band signal LB" excluding the overlapping band signal by the second extractor EX2 into the first integrated signal IS1; the high band signal HB and the first integrated signal IS1 are then combined by the second diplexer D2 into the first output signal OS1 that is then transmitted to the first output port OP1 and the first input port CMIP1 of the communication module. The first L5 band signal LB3 is inputted via the passive antenna of the third antenna group ANT3, and is amplified by the second LNA LNA2 into the amplified first L5 band signal LB3' and transmitted to the second switch SW2; the amplified first L5 band signal LB3' is then selectively outputted by the second switch SW2 to the second output port OP2 and the second input port CMIP2 of the communication module.

Figure 3:
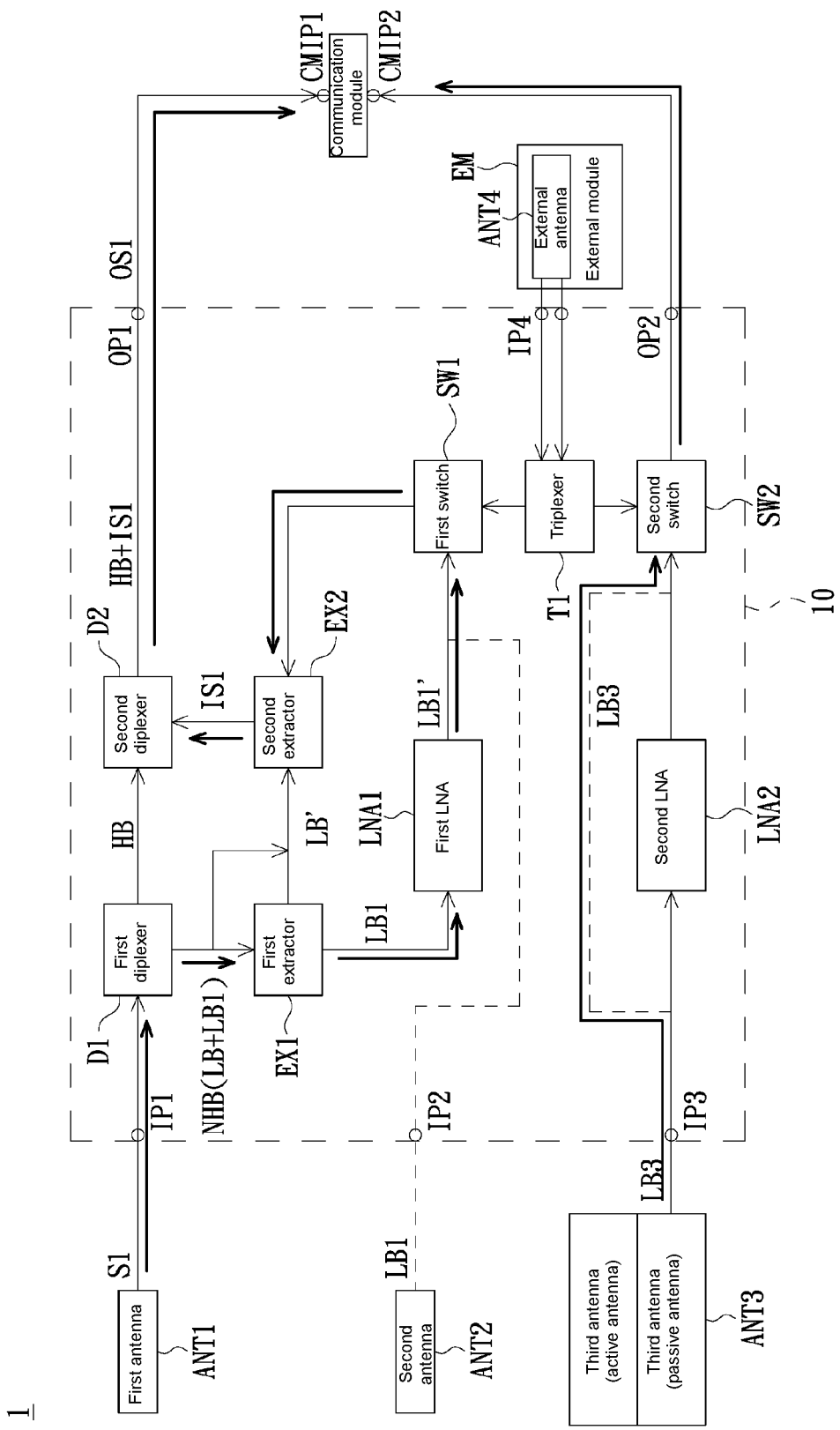
FIG. 3 is a schematic diagram of signal paths according to a second embodiment of the present invention.

In the second embodiment, as shown in FIG. 3, the input signal S1 is inputted via the first antenna ANT1, and is separated into the high band signal HB and the non-high band signal NHB by the first diplexer D1, wherein the non-high band signal NHB is separated into the low band signal LB and the first L1 band signal LB1 by the first extractor EX1. At the same time, the first extractor EX1 filters out the signal existing in the overlapping band (i.e., 1.563 GHz to 1.61 GHz) from the low band signal LB so that the energy of such signal is minimized or even approaches zero, outputs the first L1 band signal LB1 from the first output terminal, and outputs the low band signal LB' from which the overlapping band signal is filtered out from the second output terminal. The first L1 band signal LB1 is amplified by the first LNA LNA1 into the amplified first L1 band signal LB1' and transmitted to the first switch SW1, and is selectively outputted to the second extractor EX2 by the first switch SW1. The second extractor EX2 combines the low band signal LB' from which the overlapping signal is filtered out and the amplified first L1 band signal LB1' into the first integrated signal IS1, and outputs the first integrated signal IS1 from the output terminal. The high band signal HB and the first integrated signal IS1 are integrated by the second diplexer D2 into the first output signal OS1 and outputted to the first output port OP1 and the first input port CMIP1 of the communication module. The first L5 band signal LB3 is inputted via the active antenna of the third antenna group ANT3, and can be directly transmitted to the second switch SW2 without an LNA since being inputted via the active antenna of the third antenna group ANT3. The second switch SW2 selectively outputs the first L5 band signal LB3 to the second output port OP2 and the second input port CMIP2 of the communication module.

Figure 4:
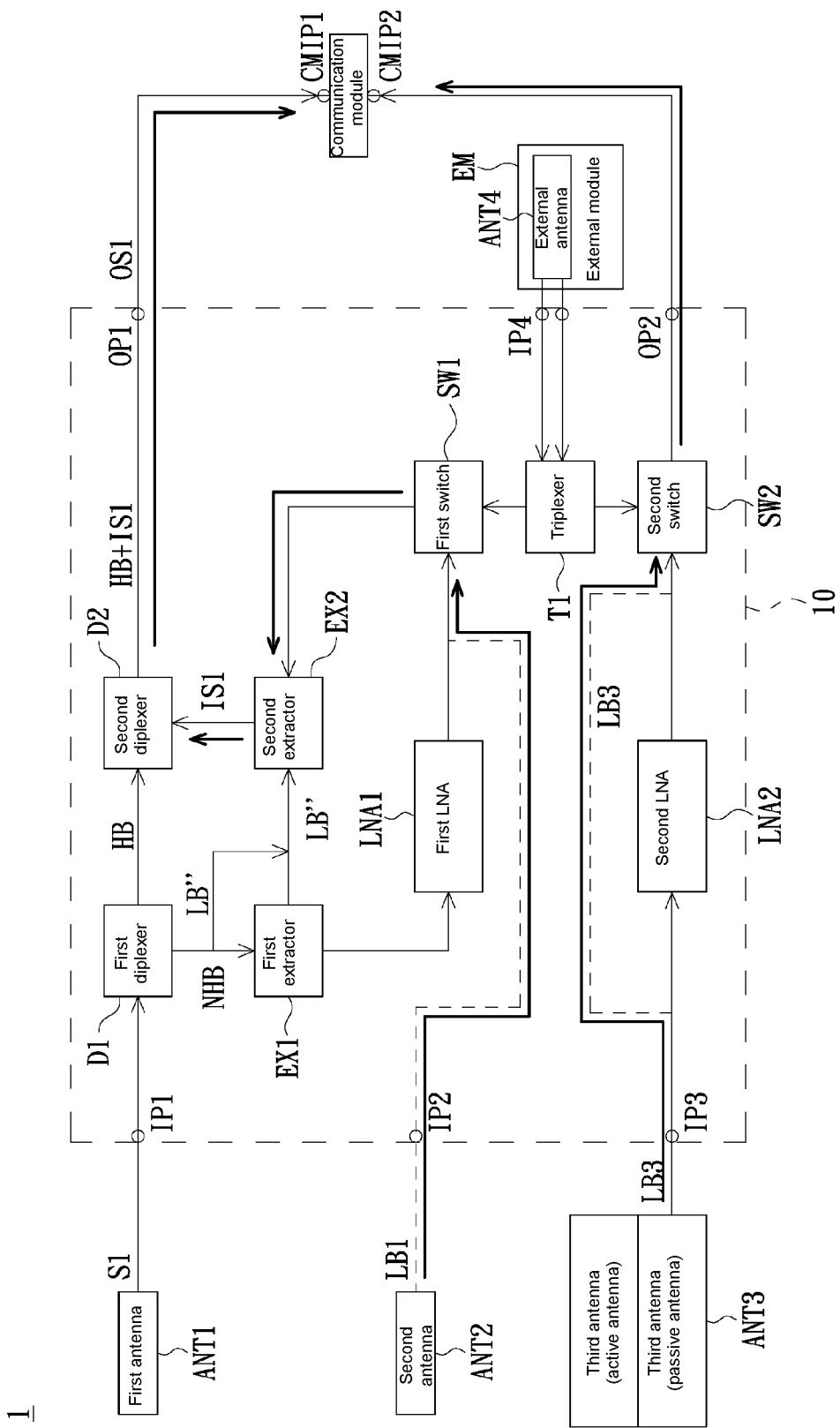
FIG. 4 is a schematic diagram of signal paths according to a third embodiment of the present invention.

In the third embodiment, as shown in FIG. 4, the first L1 band signal LB1 is inputted via the second antenna ANT2, and can be directly transmitted into the first switch SW1 without needing an LNA since the second antenna ANT2 is an active antenna. The first switch SW1 selectively outputs the first L1 band signal LB1 to the second extractor EX2. The second extractor EX2 integrates the first L1 band signal LB1 and the low band signal LB" excluding the overlapping band signal into the first integrated signal IS1, and transmits the first integrated signal IS1 to the second diplexer D2. The second diplexer D2 combines the high band signal HB and the first integrated signal IS1 into the first output signal OS1 and transmits the first integrated output signal OS1 to the first output port OP1 and the first input port CMIP1 of the communication module. The first L5 band signal LB3 is inputted via the active antenna of the third antenna group ANT3, and can be directly transmitted to the second switch SW2 without going through an LNA since being inputted via the active antenna of the third antenna group ANT3. The second switch SW2 selectively outputs the first L5 band signal LB3 to the second output port OP2 and the second input port CMIP2 of the communication module.

Figure 5:
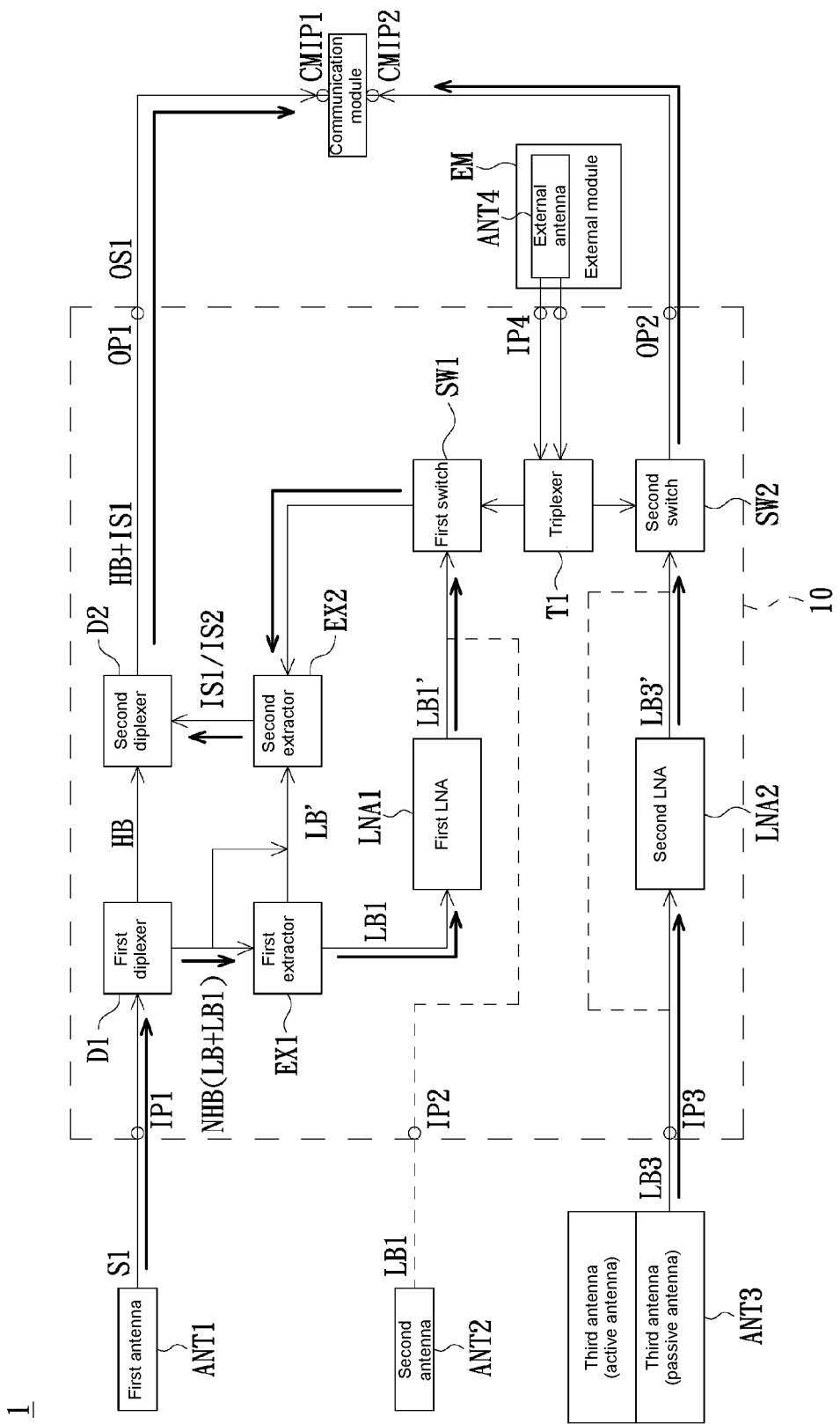
FIG. 5 is a schematic diagram of signal paths according to a fourth embodiment of the present invention.

In the fourth embodiment, as shown in FIG. 5, the input signal S1 is inputted via the first antenna ANT1, and is separated into the high band signal HB and the non-high band signal NHB by the first diplexer D1, wherein the non-high band signal NHB is separated into the low band signal LB and the first L1 band signal LB1 by the first extractor EX1. At the same time, the first extractor EX1 filters out the signal existing in the overlapping band (i.e., 1.563 GHz to 1.61 GHz) from the low band signal LB, so that the energy of such signal is minimized or even approaches zero, outputs the first L1 band signal LB1 from the first output terminal, and outputs the low band signal LB' from which the overlapping band signal is filtered out from the second output terminal. The first L1 band signal LB1 is amplified by the first LNA LNA1 into the amplified first L1 band signal LB1' and transmitted to the first switch SW1, and is selectively outputted to the second extractor EX2 by the first switch SW1. The second extractor EX2 combines the low band signal LB' from which the overlapping signal is filtered out and the amplified first L1 band signal LB1' into the first integrated signal IS1, and outputs the first integrated signal IS1 to the second diplexer D2. The high band signal HB and the first integrated signal IS1 are integrated by the second diplexer D2 into the first output signal OS1 and outputted to the first output port OP1 and the first input port CMIP1 of the communication module. The first L5 band signal LB3 is inputted via the active antenna of the third antenna group ANT3, and is amplified by the second LNA LNA2 into the first L5 band signal LB3' and transmitted to the second switch SW2. The second switch SW2 selectively outputs the amplified first L5 band signal LB3' to the second output port OP2 and the second input port CMIP2 of the communication module.

In conclusion, in the signal integration circuit and the electronic device provided according to the embodiments of the present invention, multiple different input signals (including the input signal, the first L1 band signal LB1, the second L1 band signal LB2, the first L5 band signal LB3 and the second L5 band signal LB4) are simultaneously received by the signal integration circuit, the signal of a band overlapping with the L1 band is filtered out from the input signal, and the signals are integrated into one output signal, which is then outputted together with the L5 band signal to the input port of the communication module. Accordingly, the requirement of reducing the number of input ports of a communication module can be satisfied without affecting the download speed of input signals or the reception sensitivity for the L1 band.

The present invention is disclosed as the embodiments above. However, these embodiments are not to be construed as limitation to the present invention. Slight modifications and variations may be made by a person skilled in the art without departing from the spirit and scope of the present invention. Therefore, the scope of protection of the present invention is to be accorded with the appended claims.

What is claimed is:

1. A signal integration circuit, suitable for a communication module and an external module, the signal integration circuit comprising:

a first input port, coupled to an input signal, wherein the input signal comprises a high band signal and a non-high band signal, the non-high band signal comprises a low band signal, or comprises a low band signal and a first L1 band signal, and wherein the first L1 band signal has an overlapping band overlapping with a specific frequency in the low band signal;

a second input port, coupled to the first L1 band signal, for inputting the first L1 band signal;

a third input port, coupled to the first L5 band signal, for inputting the first L5 band signal;

a fourth input port, coupled to the external module so as to input a second L1 band signal and a second L5 band signal, wherein the external module outputs the second L1 band signal and the second L5 band signal, a band of the second L1 band signal partially overlaps with a band of the first L1 band signal, and a band of the second L5 band signal partially overlaps with a band of the first L5 band signal;

a first output port, coupled to the communication module, selectively outputting a first output signal and a second output signal, wherein the first output signal comprises the high band signal, the low band signal excluding a signal of the overlapping band, and the first L1 band signal, and the second output signal comprises the high band signal, the low band signal excluding the signal of the overlapping band, and the second L1 band signal; and a second output port, coupled to the communication module, selectively outputting the first L5 band signal and the second L5 band signal;

wherein, when the fourth input port is not coupled to the external module, the first output port outputs the first output signal, and the second output port outputs the first L5 band signal.

2. The signal integration circuit according to claim 1, further comprising:

a first diplexer, comprising an input terminal coupled to the first input port, a first output terminal and a second output terminal, the first diplexer for separating the input signal into the high band signal and the non-high band signal, the non-high band signal outputted from the first output terminal, the high band signal outputted from the second output terminal;

a first extractor, coupled to the first diplexer, comprising an input terminal coupled to the first output terminal of the first diplexer, a first output terminal and a second output terminal, the first extractor for separating the low band signal and the first L1 band signal, and filtering out the signal of the overlapping band from the low band signal, wherein the first L1 band signal is outputted from the first output terminal, and the low band signal from which the signal of the overlapping band is filtered out is outputted from the second output terminal;

a first low-noise amplifier (LNA), coupled to the first extractor, comprising an input terminal coupled to the first output terminal of the first extractor and an output terminal, the first LNA for amplifying and outputting the first L1 band signal from the output terminal;

a triplexer, coupled to the external module, comprising an input terminal coupled to the fourth input port, a first output terminal and a second output terminal, the triplexer for selectively outputting the second L1 band signal from the first output terminal and selectively outputting the second L5 band signal from the second output terminal; and a first switch, comprising a first input terminal coupled to the second input port and the output terminal of the first LNA, a second input terminal coupled to the first output terminal of the triplexer and an output terminal, wherein the output terminal is selectively coupled to the first input terminal and the second input terminal to selectively output the first L1 band signal, the amplified first L1 band signal and the second L1 band signal.

3. The signal integration circuit according to claim 2, further comprising:

a second extractor, coupled to the first diplexer, the first extractor and the first switch, comprising a first input terminal coupled to the first output terminal of the first diplexer and the second output terminal of the first extractor, a second input terminal coupled to the output terminal of the first switch and an output terminal, the second extractor combining the low band signal excluding the signal of the overlapping band and the first L1 band signal, or the low band signal from which the signal of the overlapping band is filtered out and the amplified first L1 band signal into a first integrated signal, and combining the low band signal excluding the signal of the overlapping band and the second L1 band signal, or the low band signal from which the signal of the overlapping band is filtered out and the second L1 band signal into a second integrated signal, and outputting the first integrated signal and the second integrated signal from the output terminal;

a second diplexer, coupled to the first diplexer and the second extractor, comprising a first input terminal coupled to the second output terminal of the first diplexer, a second input terminal coupled to the output terminal of the second extractor and an output terminal coupled to the first output port, the second diplexer for combining the high band signal and the first integrated signal or the second integrated signal into the first output signal or the second output signal, and outputting the first output signal or the second output signal from the first output terminal; and a second switch, comprising a first input terminal coupled to the third input port, a second input terminal coupled to the second output terminal of the triplexer and an output terminal, wherein the output terminal is selectively coupled to the first input terminal and the second input terminal to selectively output the first L5 band signal and the second L5 band signal.

4. The signal integration circuit according to claim 3, further comprising:

a second LNA, comprising an input terminal coupled to the third input port and an output terminal coupled to the first input terminal of the second switch, the second LNA for amplifying and outputting the first L5 band signal from the output terminal.

5. The signal integration circuit according to claim 3, wherein the first input terminal of the first switch is coupled to the second input port so as to input the first L1 band signal.

6. The signal integration circuit according to claim 1, wherein when the second L1 band signal inputted at the fourth input port is selected, the first output port outputs the second output signal, and the second output port outputs the first L5 band signal; and when the second L5 band signal inputted at the fourth input port is selected, the first output port outputs the first output signal, and the second output port outputs the second L5 band signal.

7. The signal integration circuit according to claim 1, wherein the external module comprises external antennas of the second L1 band signal and the second L5 band signal.

8. The signal integration circuit according to claim 7, wherein
the first input port is coupled to a first antenna so as to receive the input signal;
the second input port is coupled to a second antenna so as to receive the first L1 band signal; and
the third input port is coupled to a third antenna group so as to receive the first L5 band signal, wherein the third antenna group comprises an active antenna and a passive antenna of the first L5 band signal; and
wherein a signal strength of the second L1 band signal is greater than that of the first L1 band signal, and a signal strength of the second L5 band signal is greater than that of the first L5 band signal.

9. An electronic device, comprising:
a communication module;
an external module; and
a signal integration circuit, comprising:
a first input port, coupled to an input signal, wherein the input signal comprises a high band signal and a non-high band signal, the non-high band signal comprises a low band signal, or comprises a low band signal and a first L1 band signal, and wherein the first L1 band signal has an overlapping band overlapping with a specific frequency in the low band signal;
a second input port, coupled to the first L1 band signal, for inputting the first L1 band signal;
a third input port, coupled to the first L5 band signal, for inputting the first L5 band signal;
a fourth input port, coupled to the external module so as to input a second L1 band signal and a second L5 band signal, wherein the external module outputs the second L1 band signal and the second L5 band signal, a band of the second L1 band signal partially overlaps with a band of the first L1 band signal, and a band of the second L5 band signal partially overlaps with a band of the first L5 band signal; and
a first output port, coupled to the communication module, selectively outputting a first output signal and a second output signal, wherein the first output signal comprises the high band signal, the low band signal excluding a signal of the overlapping band, and the first L1 band signal, and the second output signal comprises the high band signal, the low band signal excluding the signal of the overlapping band, and the second L1 band signal; and
a second output port, coupled to the communication module, selectively outputting the first L5 band signal and the second L5 band signal;
wherein, when the fourth input port is not coupled to the external module, the first output port outputs the first output signal, and the second output port outputs the first L5 band signal.

10. The electronic device according to claim 9, wherein the integration circuit further comprises:
a first diplexer, comprising an input terminal coupled to the first input port, a first output terminal and a second output terminal, the first diplexer for separating the input signal into the high band signal and the non-high band signal, the non-high band signal outputted from the first output terminal, the high band signal outputted from the second output terminal;
a first extractor, coupled to the first diplexer, comprising an input terminal coupled to the first output terminal of the first diplexer, a first output terminal and a second output terminal, the first extractor for separating the low band signal and the first L1 band signal, and filtering out the signal of the overlapping band from the low band signal, wherein the first L1 band signal is outputted from the first output terminal, and the low band signal from which the signal of the overlapping band is filtered out is outputted from the second output terminal;
a first low-noise amplifier (LNA), coupled to the first extractor, comprising an input terminal coupled to the first output terminal of the first extractor and an output terminal, the first LNA for amplifying and outputting the first L1 band signal from the output terminal;
a triplexer, coupled to the external module, comprising an input terminal coupled to the fourth input port, a first output terminal and a second output terminal, the triplexer for selectively outputting the second L1 band signal from the first output terminal and selectively outputting the second L5 band signal from the second output terminal; and
a first switch, comprising a first input terminal coupled to the second input port and the output terminal of the first LNA, a second input terminal coupled to the first output terminal of the triplexer and an output terminal, wherein the output terminal is selectively coupled to the first input terminal and the second input terminal to selectively output the first L1 band signal, the amplified first L1 band signal and the second L1 band signal.

11. The electronic device according to claim 10, wherein the integration circuit further comprises:
a second extractor, coupled to the first diplexer, the first extractor and the first switch, comprising a first input terminal coupled to the first output terminal of the first diplexer and the second output terminal of the first extractor, a second input terminal coupled to the output terminal of the first switch and an output terminal, the second extractor combining the low band signal excluding the signal of the overlapping band and the first L1 band signal, or the low band signal from which the signal of the overlapping band is filtered out and the amplified first L1 band signal into a first integrated signal, and combining the low band signal excluding the signal of the overlapping band and the second L1 band signal, or the low band signal from which the signal of the overlapping band is filtered out and the second L1 band signal into a second integrated signal, and outputting the first integrated signal and the second integrated signal from the output terminal;
a second diplexer, coupled to the first diplexer and the second extractor, comprising a first input terminal coupled to the second output terminal of the first diplexer, a second input terminal coupled to the output terminal of the second extractor and an output terminal coupled to the first output port, the second diplexer for combining the high band signal and the first integrated signal or the second integrated signal into the first output signal or the second output signal, and outputting the first output signal or the second output signal from the first output terminal; and
a second switch, comprising a first input terminal coupled to the third input port, a second input terminal coupled to the second output terminal of the triplexer and an output terminal, wherein the output terminal is selectively coupled to the first input terminal and the second input terminal to selectively output the first L5 band signal and the second L5 band signal.

12. The electronic device according to claim 11, wherein the integration circuit further comprises:
a second LNA, comprising an input terminal coupled to the third input port and an output terminal coupled to the first input terminal of the second switch, the second LNA for amplifying and outputting the first L5 band signal from the output terminal.

13. The electronic device according to claim 11, wherein the first input terminal of the first switch is coupled to the second input port so as to input the first L1 band signal.

14. The electronic device according to claim 9, wherein
when the second L1 band signal inputted at the fourth input port is selected, the first output port outputs the second output signal, and the second output port outputs the first L5 band signal; and
when the second L5 band signal inputted at the fourth input port is selected, the first output port outputs the first output signal, and the second output port outputs the second L5 band signal.

15. The electronic device according to claim 9, wherein the external module comprises external antennas of the second L1 band signal and the second L5 band signal.

16. The electronic device according to claim 15, further comprising:
a first antenna, coupled to the first input port, for receiving the input signal;
a second antenna, coupled to the second input port, for receiving the L1 band signal; and
a third antenna group, coupled to the third input port, for receiving the first L5 band signal, wherein the third antenna group comprises an active antenna and a passive antenna of the first L5 band signal;
wherein a signal strength of the second L1 band signal is greater than that of the first L1 band signal, and a signal strength of the second L5 band signal is greater than that of the first L5 band signal.

* * * * *